(12) United States Patent  
Fujita (10) Patent No.: US 6,986,246 B2  
(45) Date of Patent: Jan. 17, 2006

(54) SIDE THRUSTER VALVE AND SIDE THRUSTER DEVICE

(75) Inventor: Toshiharu Fujita, Komaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 3 days.

(21) Appl. No.: 10/441,039

(22) Filed: May 20, 2003

(65) Prior Publication Data

US 2003/0217547 A1 Nov. 27, 2003

(30) Foreign Application Priority Data

May 21, 2002 (JP) ........................ 2002-146101  
May 21, 2002 (JP) ........................ 2002-146102

(51) Int. Cl.  
*F02K 1/18* (2006.01)

(52) U.S. Cl. .......................... 60/242; 60/771
(58) Field of Classification Search ............ 239/265.19; 60/711, 242  
See application file for complete search history.

(56) References Cited

U.S. PATENT DOCUMENTS 3,178,883 A * 4/1965 Webb ..................... 60/242  
3,848,806 A * 11/1974 Samuelsen et al. .... 239/265.11  
6,170,257 B1 * 1/2001 Harada et al. ........... 60/242  
6,233,919 B1 * 5/2001 Abel et al. .............. 60/204

FOREIGN PATENT DOCUMENTS

| JP | 43-13887    | 6/1968  |
| JP | 62-59748    | 4/1987  |
| JP | 7-317932    | 12/1995 |
| JP | 11-280433   | 10/1999 |
| JP | 1-179100    | 12/1999 |
| JP | 3027558     | 1/2000  |
| JP | 2000-297701 | 10/2000 |
| JP | 2001-41105  | 2/2001  |

* cited by examiner

*Primary Examiner*—Ehud Gartenberg  
(74) *Attorney, Agent, or Firm*—Wenderoth, Lind & Ponack, L.L.P.

(57) ABSTRACT

A side thruster valve of an aerospace craft is improved to reduce torque of a servo-motor, etc. needed for nozzle opening and closing to thereby realize a compact and light weight device. The side thruster valve comprises a valve plug having its back directed to an axis of the aerospace craft and independently movable between a fully opened position and a fully closed position of the valve plug in a plane orthogonal to the axis of the aerospace craft, an actuating means for moving the valve plug in an axial direction of the valve plug and an elastic member for activating the valve plug in the axial direction of the valve plug. In a side thruster device comprising a plurality of the side thruster valves, the side thruster valves are arranged independently of each other to thereby broaden freedom of combustion control and improve fuel consumption.

4 Claims, 9 Drawing Sheets

SIDE THRUSTER VALVE AND SIDE THRUSTER DEVICE

TECHNICAL FIELD

Field of the Invention

The present invention relates to a side thruster valve for performing motion control of an aerospace craft by using solid propellant and also relates to a side thruster device using this side thruster valve.

DESCRIPTION OF THE PRIOR ART

A prior art side thruster valve that performs motion control of an aerospace craft can be basically separated into two types, that is, one in which a plurality of respectively independent side thruster valves are arranged and the other in which two valves having their backs connected to each other are arranged symmetrically relative to a central axis of the aerospace craft so that the valves are opened on one side and closed on the other side by a common shaft having valve plugs. Here, as one example of the prior art side thruster valve, the latter type will be outlined with reference to FIG. 11.

Figure 11:
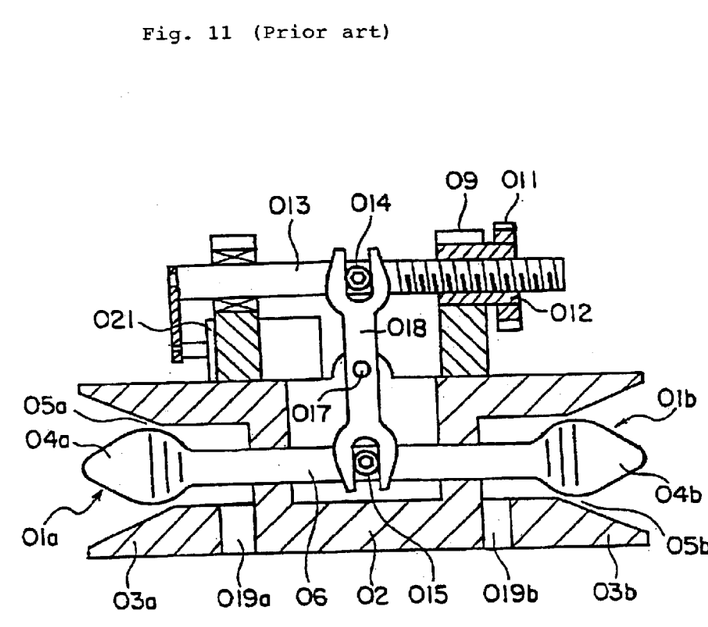
FIG. 11 is a cross sectional view showing one example of a side thruster valve in a prior art side thruster device.

FIG. 11 is a cross sectional view showing one example of a side thruster valve used in a prior art side thruster device.

Numerals 01a, 01b designate nozzles, that are constructed within a housing 02 and comprise nozzle skirts 03a, 03b and valve plugs 04a, 04b. The nozzles 01a, 01b are arranged having their backs connected to each other symmetrically relative to a central axis as a symmetry axis of the aerospace craft.

Inside of the nozzle skirts 03a, 03b that have their backs likewise connected to each other, the valve plugs 04a, 04b, respectively, are arranged being connected to each other by a common shaft 06.

The shaft 06 has a joint 015 at a central position in the shaft longitudinal direction and connects to a link 018 via the joint 015. The link 018 is constructed to connect to a screwed shaft 013 via another joint 014 that exists at a symmetry position of the joint 015 and to be rotatable swingingly right and left in the figure around a pin 017 that exists at a central fulcrum position of the link 018.

The screwed shaft 013 engages with a nut 012 that is supported to a casing 09 rotatably in a fixed position. The nut 012 is joined with a toothed gear 011 and both of the nut 012 and the toothed gear 011 are rotatable by a servo-motor or the like (not shown).

The screwed shaft 013 is connected to a potentiometer 021, so that motion of the screwed shaft 013 in its axial direction and the resulted rotation angle of the link 018 around the pin 017 can be detected.

Thus, in the prior art side thruster valve, when the servo-motor or the like is rotated, the screwed shaft 013 is rotated by the engagement with the nut 012 to be moved in the axial direction.

This axial motion of the screwed shaft 013 is conveyed to the shaft 06 via the link 018. Thereby, the valve plugs 04a, 04b provided at both ends of the shaft 06 open one of nozzle throats 05a, 05b and close the other of them. Thus, jetting of combustion gas supplied from supply ports 019a, 019b is adjusted to thereby change the thrust continuously and differentially.

In the prior art side thruster valve as exemplified and described above, the valve plugs 04a, 04b, opposed to each other, are connected by the single shaft 06. Thereby, the fluid forces acting on the valve plugs 04a, 04b in the mutually reverse directions are canceled and the drive force of the servo-motor can be reduced, which is advantageous to some extent.

Also, for moving the opposed two nozzles 01a, 01b, one servo-motor is provided so that the thrust is changed over in the opposed directions. Hence, as compared with the case where the nozzles 01a, 01b are opened or closed independently of each other, there is also obtained an advantage that the space of the servo-motor can be reduced.

However, all the drive force of the nozzles 01a, 01b depends on the actuator device comprising the servo-motor and the mechanism of the screwed shaft 013, the link 018, etc. and there is caused a large inertia force of the mechanism of the shaft 06, the valve plugs 04a, 04b, the link 018, etc. Hence, in order to realize a quick response by reducing the thrust change-over time, there is inevitably required a high torque of the servo-motor, which leads to a large size of the device.

Also, due to the symmetry arrangement of the nozzles 01a, 01b to be symmetrically opened and closed by the link 018, etc., the areas of the nozzle throats 05a, 05b are not changeable independent of each other. Hence, in the combustion using solid propellant, there arises a problem that such a combustion control that, when no thrust is needed, all the nozzles are opened to thereby reduce the combustion gas pressure of the solid propellant and to reduce the combustion speed for improving the fuel consumption cannot be done.

SUMMARY OF THE INVENTION

In order to solve the abovementioned problems in the prior art side thruster valve, it is an object of the present invention to provide a side thruster valve in which a required torque of an actuating means including a drive unit, such as a servo-motor, needed for opening and closing the nozzle is reduced to thereby realize a compact and light weight device. Also, it is another object of the present invention to provide a side thruster device in which a plurality of the mentioned compact and light weight side thruster valves are provided independently of each other to thereby broaden a freedom of combustion control and improve the fuel consumption.

For achieving the mentioned object, as a first means, the present invention provides a side thruster valve of a type performing thrust adjustment for motion control of an aerospace craft by changing valve plug opening and thereby changing jetting of combustion gas, comprising a valve plug having its back directed to an axis of the aerospace craft and independently movable between a fully opened position and a fully closed position of the valve plug in a plane orthogonal to the axis of the aerospace craft, an actuating means for moving the valve plug in an axial direction of the valve plug and an elastic member for activating the valve plug in the axial direction of the valve plug.

That is, according to the first means of the present invention, the side thruster valve comprises the valve plug independently movable between the fully opened position and the fully closed position, the actuating means for moving the valve plug in the valve plug axial direction and the elastic member for activating the valve plug in the valve plug axial direction. By the cooperation of the actuating means and the elastic member, the valve plug, having its back directed to the aerospace craft axis, is moved between the fully opened position and the fully closed position in the plane orthogonal to the aerospace craft axis. Thereby, the opening of the valve plug is changed so as to change the jetting of the combustion gas and the thrust is adjusted to thereby control the motion of the aerospace craft.

Also, as a second means, the present invention provides a side thruster valve as mentioned in the first means, wherein the elastic member is a spring that activates the valve plug to a neutral position from the fully opened position or the fully closed position of the valve plug and the spring is set to its natural length when the valve plug is in the neutral position.

That is, according to the second means, in order to move the valve plug to the fully opened position or the fully closed position, the actuating means and the spring as the elastic member cooperate with each other. The spring is set to its natural length at the neutral position of the valve plug, so that the valve plug is activated to move to the neutral position from the fully opened position or the fully closed position. Thus, in the opening and closing of the valve plug, the function of the actuating means is largely assisted by the spring force and the required torque of the actuating means including a drive unit, such as a servo-motor, is reduced and a compact and light weight device can be realized.

Also, as a third means, the present invention provides a side thruster valve as mentioned in the first means, wherein the valve plug is constructed integrally and coaxially with a piston that is slidable within a cylinder by receiving the combustion gas on one side of the piston, the one side of the piston communicates with a cylinder chamber formed on the other side of the piston via an orifice and there are provided a device that controls the cylinder chamber to open into the atmosphere and a spring as the elastic member that activates the valve plug to a closing side of the valve plug.

That is, according to the third means, the combustion gas acts on one side of the piston that is constructed integrally and coaxially with the valve plug and is supplied via the orifice into the cylinder chamber that is formed on the other side of the piston. When the combustion gas pressure on the one side and the back pressure in the cylinder chamber on the other side are balanced with each other, the spring force that activates the valve plug to the closing side is added to the valve plug so that the valve plug is closed. Also, when the control device that controls the cylinder chamber to open into the atmosphere is operated, the balance of the combustion gas pressure and the back pressure in the cylinder chamber is released and thereby the valve plug is moved to the opening side. Thus, by using the control device, such as a simple actuator, the back pressure in the cylinder chamber is controlled so as to open and close the valve plug and a compact and light weight device can be easily realized.

Moreover, as a fourth means, the present invention provides a side thruster device that comprises a plurality of the side thruster valves as mentioned in any one of the first to the third means. The plurality of side thruster valves are arranged independently of each other at the symmetrical positions relative to the axis of the aerospace craft.

That is, according to the fourth means, in the side thruster device, the side thruster valve made in the compact and light weight form by any one of the first to the third means is provided in the number of plural pieces. These side thruster valves are arranged independently of each other at the symmetrical positions relative to the axis of the aerospace craft. Hence, the plurality of side thruster valves are individually controllable and, if no thrust is needed, all of the plurality of side thruster valves are fully opened to thereby lower the combustion gas pressure, so that the combustion speed of the solid propellant is lowered and the fuel consumption can be improved.

DESCRIPTION OF THE PREFERRED EMBODIMENTS

The invention will be described more concretely based on embodiments according to the present invention with reference to the appended figures.

Figure 1:
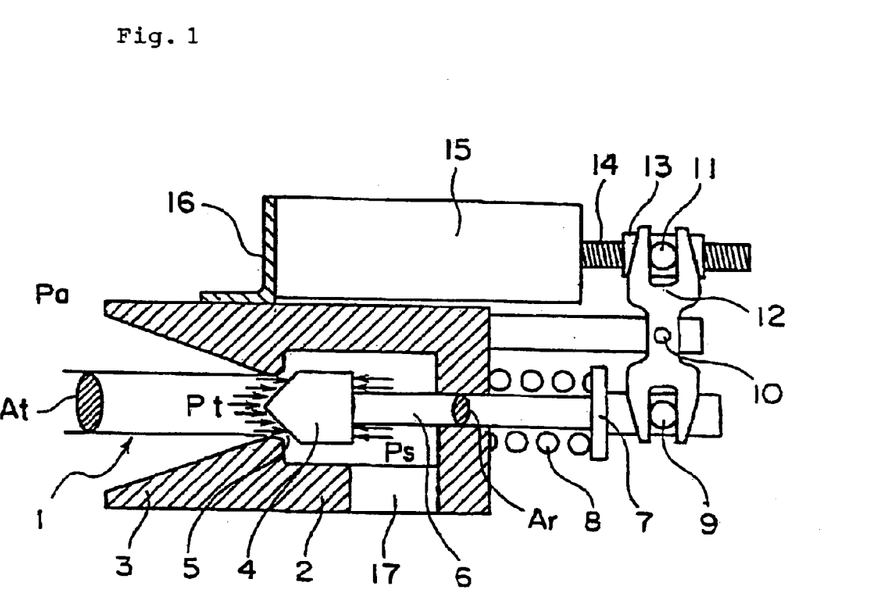
FIG. 1 is a cross sectional view of an entire side thruster valve of a first embodiment according to the present invention, in which the side thruster valve is half opened.
Figure 2:
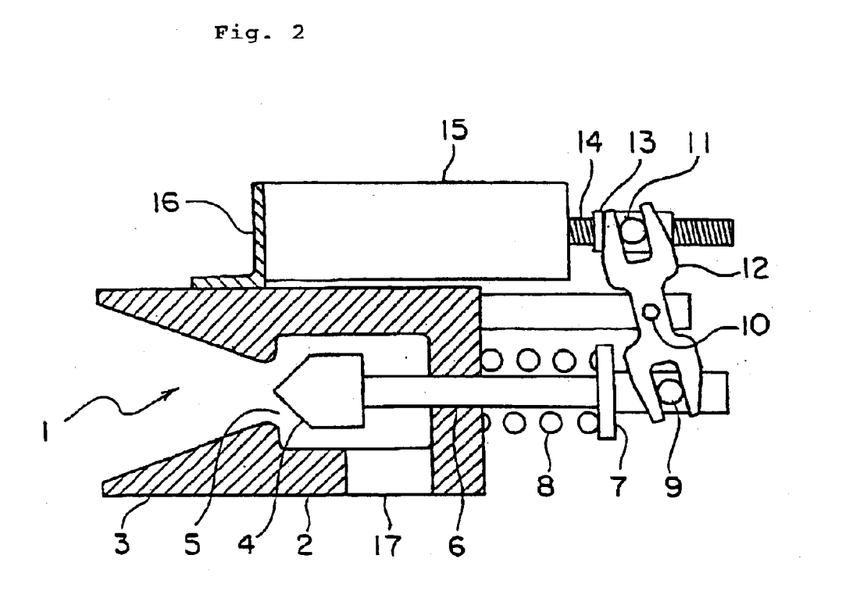
FIG. 2 is a cross sectional view of the side thruster valve of FIG. 1, in which the side thruster valve is fully opened.
Figure 3:
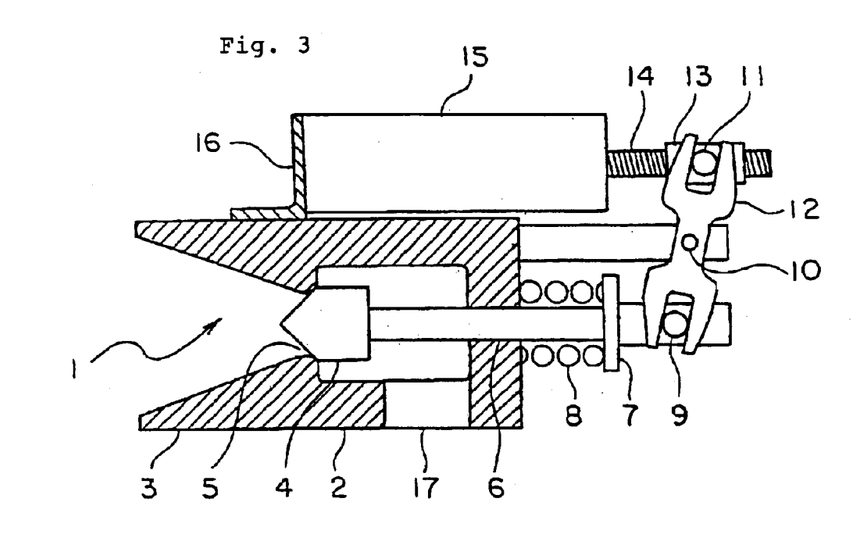
FIG. 3 is a cross sectional view of the side thruster valve of FIG. 1, in which the side thruster valve is fully closed.
Figure 4:
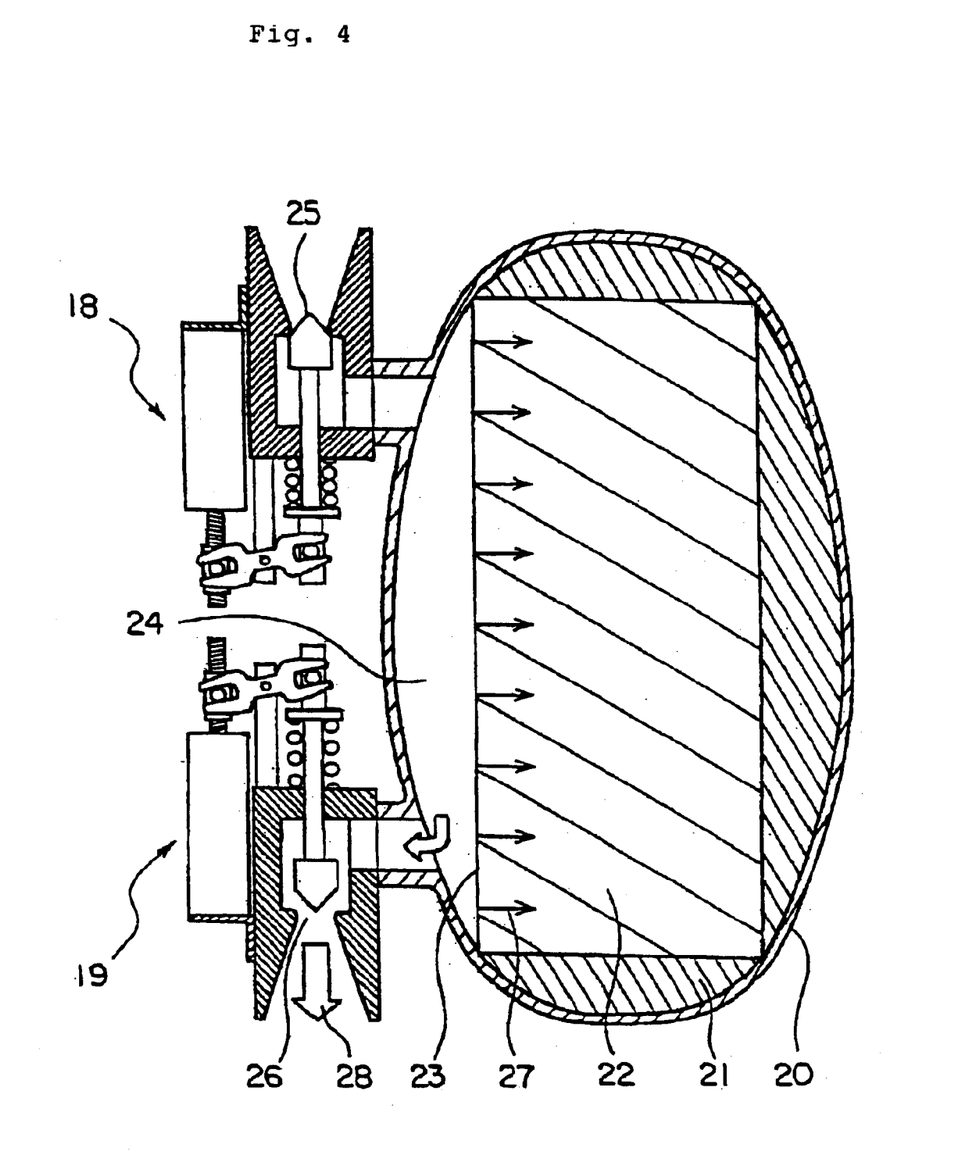
FIG. 4 is a cross sectional view of a side thruster device comprising the side thruster valve of FIG. 1, in which the side thruster device is fully opened on its one side.
Figure 5:
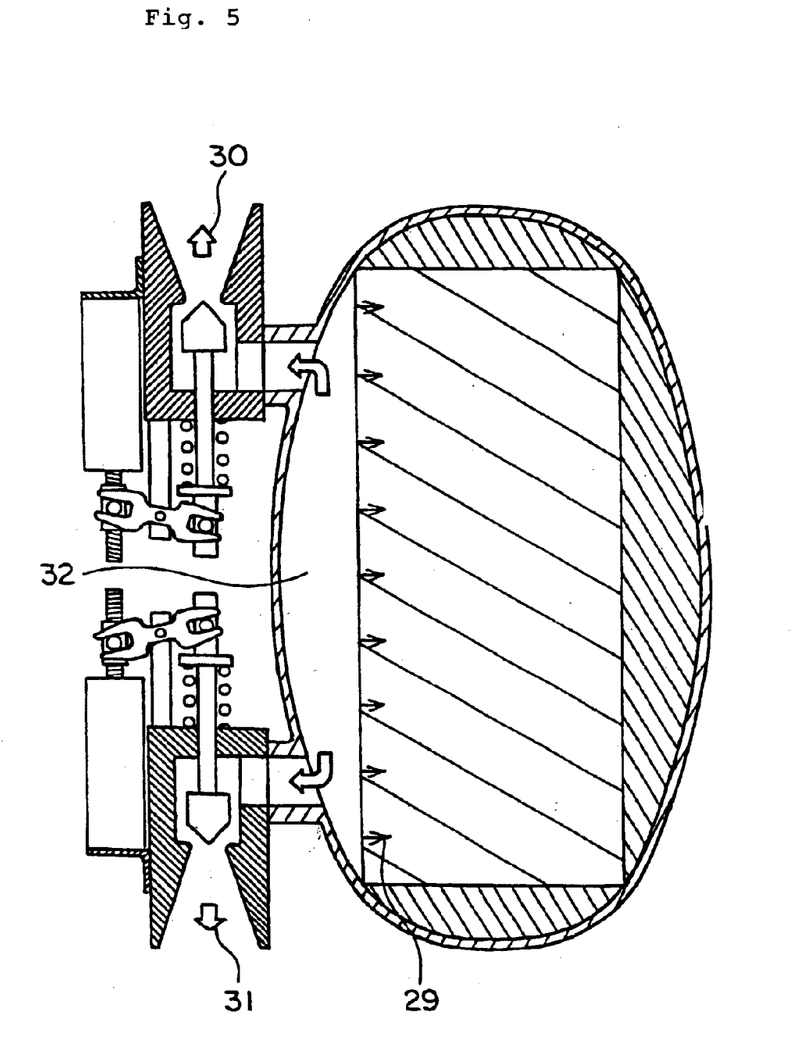
FIG. 5 is a cross sectional view of the side thruster device of FIG. 4, in which the side thruster device is fully opened on its both sides, as no thrust is needed.
Figure 6:
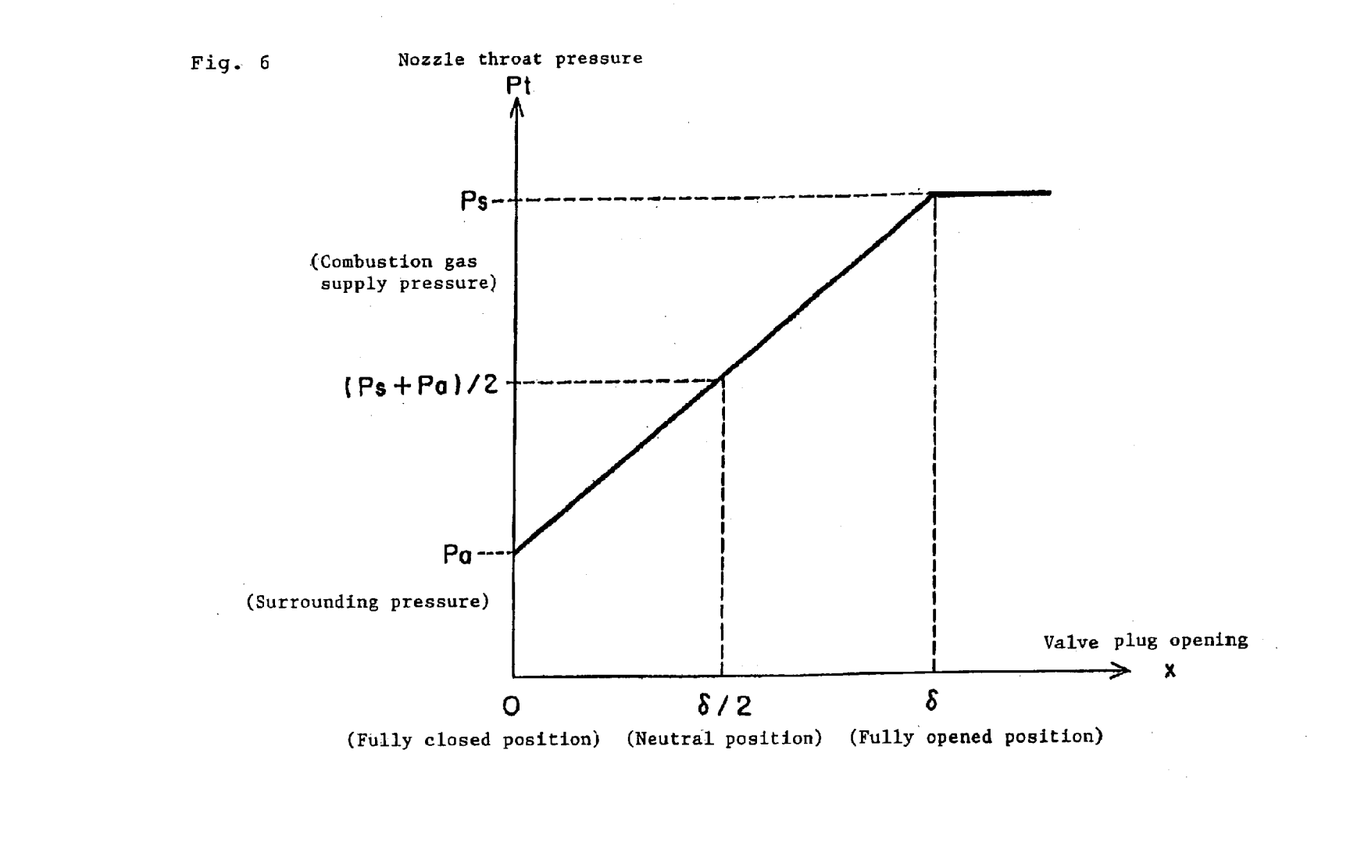
FIG. 6 is an explanatory view showing a relation between the valve plug opening and the nozzle throat pressure.

A first embodiment will be described with reference to FIGS. 1 to 6. FIG. 1 is a cross sectional view of an entire side thruster valve of the first embodiment, in which the side thruster valve is half opened. FIG. 2 is a cross sectional view of the side thruster valve of FIG. 1, in which the valve is fully opened. FIG. 3 is a cross sectional view of the side thruster valve of FIG. 1, in which the valve is fully closed. FIG. 4 is a cross sectional view of a side thruster device comprising two of the side thruster valves of FIG. 1, in which the side thruster device is fully opened in one direction so that jetting of combustion gas is effected in that direction. FIG. 5 is a cross sectional view of the side thruster device of FIG. 4, in which no thrust is needed and the side thruster device is fully opened. FIG. 6 is an explanatory view showing a relation between the valve opening and the nozzle throat pressure.

In the present first embodiment, numeral 1 designates a nozzle, that is constructed within a housing 2 as a main component part in combination with a nozzle skirt 3, a valve plug 4, etc.

That is, the valve plug 4 is provided on the combustion gas upstream side of the nozzle skirt 3. Combustion gas is supplied from a supply port 17 provided on one side of the valve plug 4 to be jetted through a gap between the portion of a nozzle throat 5 and the valve plug 4. Thereby, the thrust is generated by jetting of the combustion gas from the nozzle 1.

The valve plug 4 is connected to a shaft 6 and the shaft 6 slidably passes through the housing 2. By the flow path area of the nozzle throat 5 being made continuously changeable, the size of the thrust is made continuously controllable.

A spring seat 7 is fitted to the shaft 6 at the shaft end on the other side of the valve plug 4 and a spring 8 is provided between the housing 2 and the spring seat 7. The spring 8 is selected so as to maintain its natural length when the valve plug 4 is in a neutral position (that is, a mid position between the fully opened position and the fully closed position) and both ends of the spring 8 are joined to the housing 2 and the spring seat 7. Thus, the spring 8 is deformable both in the expanding (pushing) and contracting (pulling) directions corresponding to the movement of the valve plug 4 to the fully opened position and the fully closed position.

A joint 9 is fixed to the spring seat 7 and one end of a link 12 engages with the joint 9. The other end of the link 12 engages with another joint 11 that is fixed to a ball nut 13. The link 12 is made rotatable swingingly around a pin 10 as a fulcrum.

The ball nut 13 engages with a ball screw 14 provided on a rotating shaft of a servo-motor 15 and the servo-motor 15 is fitted to the housing 2 via a support 16.

That is, the structure is made such that, if the servo-motor 15 is rotated, the ball screw 14 rotates, the ball nut 13 engaged with the ball screw 14 moves in the axial direction of the ball screw 14, the link 12 is rotated via the joint 11, the joint 9 moves in the axial direction of the shaft 6 and the area of the nozzle throat 5 is changed by the valve plug 4. Thereby, the thrust is continuously changed.

In the present first embodiment according to the present invention constructed as mentioned above, where Pt is a pressure (nozzle throat pressure) acting on the surface of the nozzle throat 5 side of the valve plug 4, Pa is a surrounding pressure and Ps is a combustion gas supply pressure, as shown in FIG. 1, if the valve plug 4 is gradually separated from the nozzle throat 5, as shown in FIG. 2, the nozzle throat pressure Pt finally becomes equal to the combustion gas supply pressure Ps. This position is the fully opened position of the valve plug 4.

On the other hand, if the valve plug 4 is brought closer to the nozzle throat 5, as shown in FIG. 3, the nozzle throat 5 finally becomes fully closed and the nozzle throat pressure Pt becomes equal to the surrounding pressure Pa. This position is the fully closed position of the valve plug 4.

As the result of experiments, it is confirmed that the nozzle throat pressure Pt lowers substantially linearly from the fully opened position to the fully closed position of the valve plug 4, as shown in FIG. 6. Hence, at the neutral position of the valve plug opening where the valve plug 4 is in the mid position of the fully opened position and the fully closed position, the nozzle throat pressure of the valve plug 4 becomes equal to $(Ps+Pa)/2$, that is, $Pt=(Ps+Pa)/2$.

At this position, if a shaft area Ar of the shaft 6 is selected so that the force acting on the valve plug 4 becomes zero, where At is an area of the nozzle throat 5, then Ar equals $(1-Ps/Pa)\times At/2$, that is, $Ar=(1-Ps/Pa)\times At/2$.

On the other hand, the spring 8 is a coil spring that is set to its natural length so as to be expandable (pushing) and contractible (pulling) therefrom when the valve plug 4 is in the neutral position. Where k is a spring constant of the spring 8 and $\delta$ is an entire stroke from the fully opened position to the fully closed position of the valve plug 4, if the spring constant k is selected to be equal to $(Pt-Pa)\times At/\delta$, that is, $k=(Pt-Pa)\times At/\delta$, then the force acting on the valve plug 4 during the change of the nozzle throat pressure Pt corresponding to the opening and closing of the valve plug 4 can be canceled.

That is, according to the present first embodiment, by setting the shaft area Ar and the spring constant k as mentioned above, the fluid force acting on the valve plug 4 can be entirely canceled.

Thus, the required torque of the servo-motor 15 for driving the valve plug 4 can be only of such size as to overcome the inertia force and the friction force of the mechanism comprising the valve plug 4, the link 12, etc. and a compact and light weight servo-motor can be employed for driving the valve plug 4.

The abovementioned side thruster valve can be assembled into a side thruster device as shown in FIGS. 4 and 5.

That is, two of the side thruster valves 18, 19 having their backs mutually opposed to each other are arranged symmetrically relative to an axis of an aerospace craft and are joined to a case 20 of a single gas generator.

An insulator 21 is provided within the case 20 and solid propellant 22 is filled inside of the insulator 21. Combustion gas 24 is generated from combustion surface 23 of the solid propellant 22.

If thrust is needed on one of the two side thruster valves 18, 19, for example, the side thruster valve 19, as shown in FIG. 4, a nozzle throat area 26 of the side thruster valve 19 is ensured and, at the same time, a nozzle throat area 25 of the side thruster valve 18 is fully closed. Thereby, surface combustion of the solid propellant 22 is effected with a relatively high combustion speed 27 and combustion gas is discharged from the nozzle throat area 26 to thereby generate the thrust.

On the other hand, if no adjustment of the direction of the aerospace craft is needed and thus no thrust is needed, as shown in FIG. 5, both of the nozzle throat areas 25, 26 are fully opened to thereby cancel the generated thrust. At the same time, the nozzle throat areas 25, 26 are doubled of the rated combustion time to thereby lower the pressure of the combustion gas 24 in the gas generator. Thus, the combustion speed 29 of the solid propellant 22 is lowered and the fuel consumption can be improved.

It is to be noted that, while the example of FIGS. 4 and 5 shows a case where the two side thruster valves 18, 19 are provided, three or more of the side thruster valves may be provided according to the freedom of trajectory adjustment or motion control of the aerospace craft and, in this case, the combustion gas pressure can be further lowered and the fuel consumption is further improved.

If the altitude where the side thruster valve operates is not constant so that the surrounding pressure Pa varies or if the combustion gas supply pressure Ps supplied from the gas generator varies inconstantly, the fluid force acting on the valve plugs may not completely canceled. But if the abovementioned equations are applied with average values of the possible range of the surrounding pressure Pa and the combustion gas supply pressure Ps, then the required torque of the servo-motor 15 can be minimized.

Figure 7:
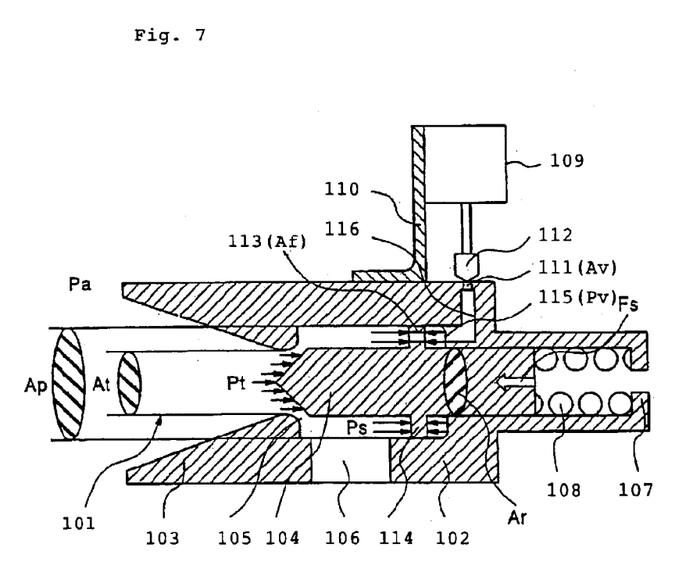
FIG. 7 is a cross sectional view of an entire side thruster valve of a second embodiment according to the present invention, in which the side thruster valve is half opened.
Figure 8:
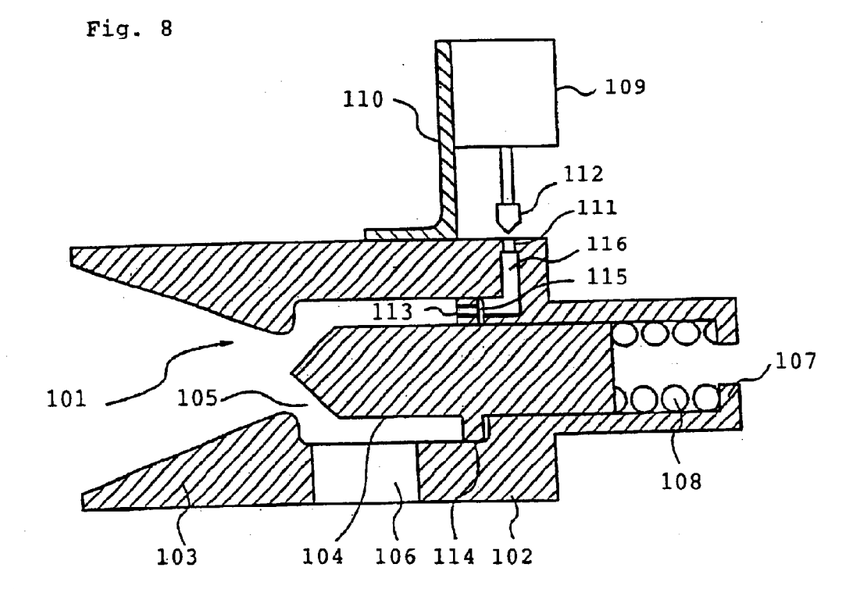
FIG. 8 is a cross sectional view of the side thruster valve of FIG. 7, in which the side thruster valve is fully opened.
Figure 9:
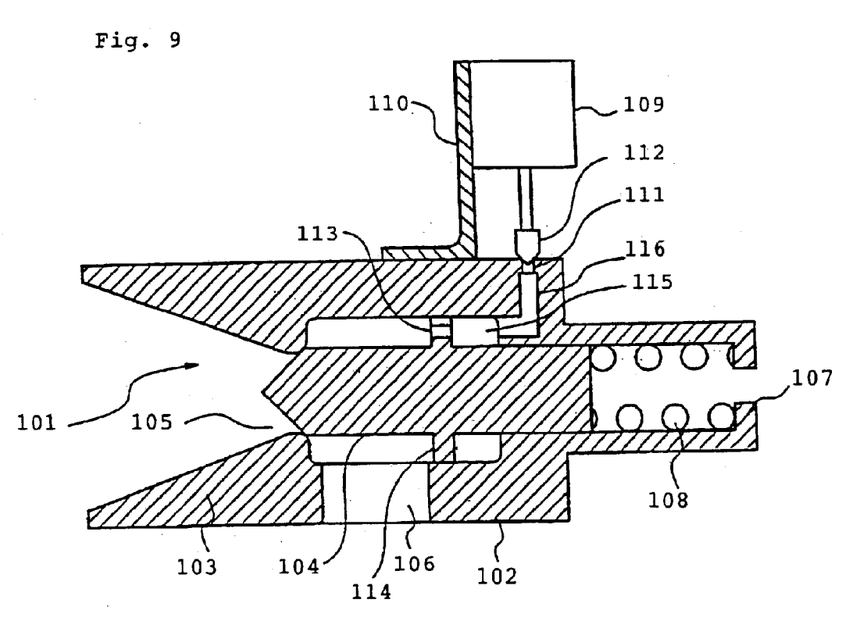
FIG. 9 is a cross sectional view of the side thruster valve of FIG. 7, in which the side thruster valve is fully closed.
Figure 10:
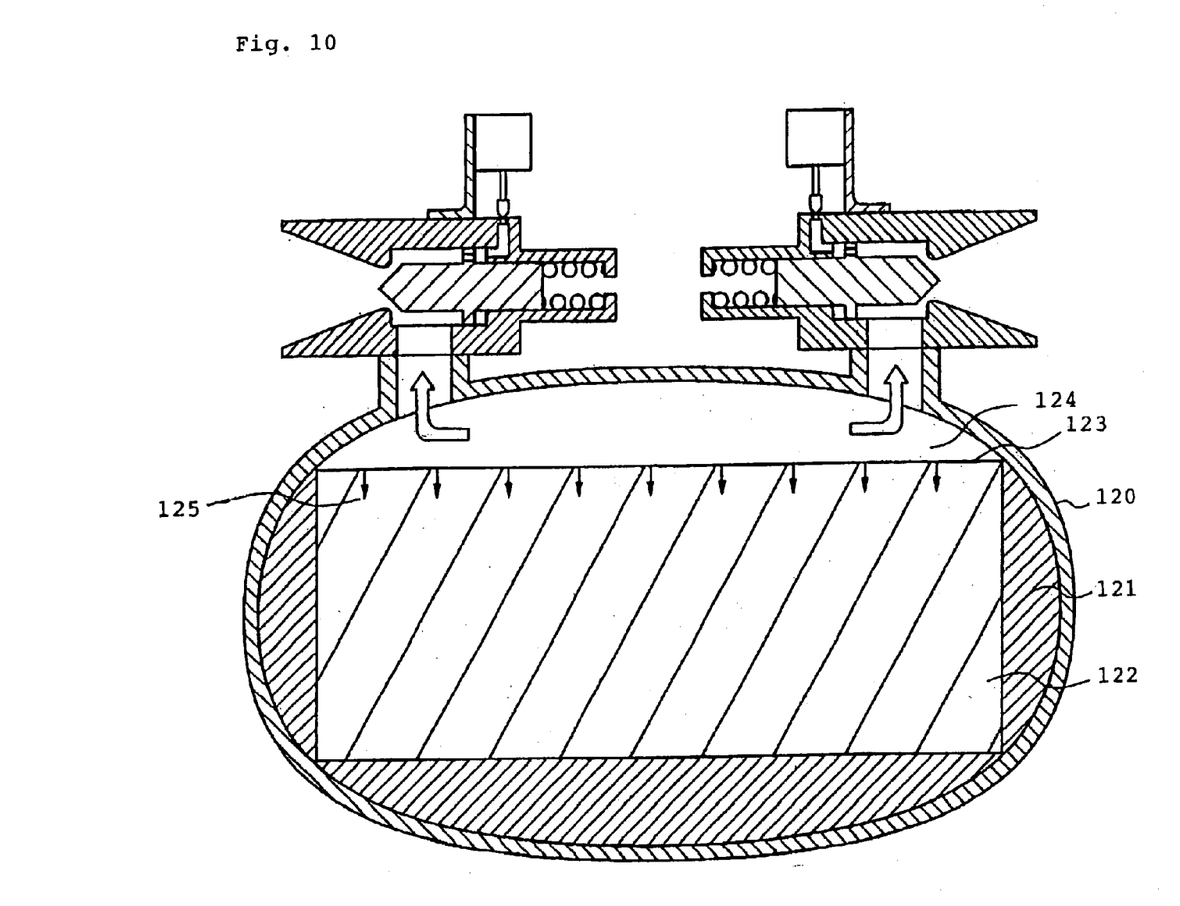
FIG. 10 is a cross sectional view of a side thruster device comprising the side thruster valve of FIG. 7, in which the side thruster device is fully opened on its both sides, as no thrust is needed.

Next, a second embodiment will be described with reference to FIGS. 7 to 10. FIG. 7 is a cross sectional view of an entire side thruster valve of the second embodiment, in which the side thruster valve is half opened. FIG. 8 is a cross sectional view of the side thruster valve of FIG. 7, in which the valve is fully opened. FIG. 9 is a cross sectional view of the side thruster valve of FIG. 7, in which the valve is fully closed. FIG. 10 is a cross sectional view of a side thruster device comprising two of the side thruster valves of FIG. 7, in which no thrust is needed and the side thruster device is fully opened.

In the present second embodiment, numeral 101 designates a nozzle, that is constructed as a main component part in combination with a cylinder 102, a nozzle skirt 103 formed at the front end of the cylinder 102, a valve plug 104, etc.

That is, the valve plug 104 is provided on the combustion gas upstream side of the nozzle skirt 103. Combustion gas is supplied from a supply port 106 provided on one side of the valve plug 104 to be jetted through a gap between the portion of a nozzle throat 105 and the valve plug 104. Thereby, the thrust is generated by jetting of the combustion gas from the nozzle 101.

The valve plug 104 at its central portion is integrally and coaxially connected with a piston 114. The piston 114 at its one side surface receives combustion gas supply pressure Ps supplied from a supply port 106 so that the piston 114 is slidable in the valve plug axial direction within the cylinder 102. By this sliding motion, the flow path area of the nozzle throat 105 is made continuously changeable and the size of the thrust is made continuously controllable.

On the other side of the abovementioned side that receives the combustion gas supply pressure Ps of the piston 114, there is formed a cylinder chamber 115. Here, the pressure generated in the cylinder chamber 115 by the function of an orifice (valve plug inner orifice), etc, which will be described below, is designated as a back pressure Pv.

The valve plug 104 on the other side of the nozzle 101 passes through the cylinder 102 and, at the end face thereof, abuts on a spring 108. The spring 108 at its other end abuts on a spring seat 107 that is integrated with the cylinder 102. Thereby, the valve plug 104 is activated in the direction of its closed position by a spring force Fs.

As a portion of the piston 114, there is provided the valve plug inner orifice 113, as mentioned above, by which one side of the piston 114 communicates with the other side, so that the combustion gas supplied from the supply port 106 can flow into the cylinder chamber 115.

A pilot flow path 116 is provided in the cylinder chamber 115 and, downstream thereof, a pilot orifice 111 is provided, so that a pilot flow can be discharged outside therefrom. The pilot orifice 111 has a flow path area that is slightly smaller than that of the pilot flow path 116 and is larger than that of the valve plug inner orifice 113.

Numeral 109 designates a linear type actuator, that is fitted to the cylinder 102 via a support 110. If the actuator 109 is driven, a pilot valve 112 opens and closes the pilot orifice 111 to thereby control the rate of pilot flow and thus the back pressure Pv in the cylinder chamber 115.

That is, by the actuator 109 as a main component part and by the orifices including the pilot orifice 111 that is opened and closed by the pilot valve 112, a device that controls the cylinder chamber 115 to open into the atmosphere is constructed.

In the present second embodiment according to the present invention constructed as mentioned above, where Pt is a pressure (nozzle throat pressure) acting on the surface of the nozzle throat 105 side of the valve plug 104, Pa is a surrounding pressure, Ps is a combustion gas supply pressure and Pv is the abovementioned back pressure in the cylinder chamber 115, as shown in FIG. 7, if the valve plug 104 is gradually separated from the nozzle throat 105, as shown in FIG. 8, the nozzle throat pressure Pt finally becomes equal to the combustion gas supply pressure Ps. This position is the fully opened position of the valve plug 104.

On the other hand, if the valve plug 104 is brought closer to the nozzle throat 105, as shown in FIG. 9, the nozzle throat 105 finally becomes fully closed and the nozzle throat pressure Pt becomes equal to the surrounding pressure Pa. This position is the fully closed position of the valve plug 104.

As the result of experiments, it is confirmed that the nozzle throat pressure Pt lowers substantially linearly from the fully opened position to the fully closed position of the valve plug 104, as described with respect to FIG. 6. In the present second embodiment, the spring 108 functions so as to cancel the change of the nozzle throat pressure Pt.

That is, if the pilot valve 112 is fully opened, the back pressure Pv in the cylinder chamber 115 becomes lower than the combustion gas supply pressure Ps and, by the differential pressure between the back pressure Pv and the combustion gas supply pressure Ps, the valve plug 104 is urged toward the spring 108. In a balanced position with the spring force Fs, the valve plug 104 finally stands still, so that the valve is fully opened and the thrust is generated by the nozzle 101.

On the other hand, if the pilot valve 112 is fully closed, the back pressure Pv in the cylinder chamber 115 becomes equal to the combustion gas supply pressure Ps and the valve plug 104 is urged toward the nozzle 101 by the force of the spring 108. Thus, the valve plug 104 makes contact with the nozzle throat 105, so that the valve is fully closed and no thrust is generated.

While the pilot plug 112 is in a middle position, the back pressure Pv is of the value corresponding to the opening of the pilot plug 112 and the position is maintained where the force due to the differential pressure between the back pressure Pv and the combustion gas supply pressure Ps, the spring force Fs and the force due to the nozzle throat pressure Pt acting on the nozzle throat portion of the valve plug 104 are balanced.

According to the present second embodiment, as the back pressure Pv largely changes with a small movement of the pilot valve 112 and also the combustion gas supply pressure Ps is as high as several MPa, the force acting on the valve plug 104 is large and, by using only a compact and light weight actuator 109, it becomes possible to drive the valve plug 104 in a highly responsive and continuous manner.

In the present second embodiment, one example of computation of the spring constant of the spring 108 and additional explanations on the relation between the spring constant and the position of valve plug 104, etc. are as follows:

In the state that: the surrounding pressure Pa=0 (vacuum), the nozzle throat area At=the shaft or rod area Ar, the pilot valve opening Av is variable between the valve plug inner orifice area Af and 2Af and the cylinder chamber back pressure Pv is variable between the combustion gas supply pressure Ps and Ps/2, and where δ is a stroke between the fully opened position and the fully closed position of the valve plug 104, by the balancing in the fully opened position of the valve plug 104, $$\begin{aligned} \text{the spring constant } k &= \{A t P s + (A p - A t) P s - (A p - A r) P v\}/\delta \\ &= \{A p P s - (A P - A r) P v\}/\delta \\ &= \{2 A t P s - A p P s/2\}/\delta \\ &= 3 P s A t / 2 \delta \end{aligned}$$

(Ap is the entire area of the cylinder 102).

In the above equation, if the pilot valve opening Av is changed to Af, 1.5Af and 2Af, respectively, the valve plug position, the spring compression force Fs, the nozzle throat pressure Pt, the combustion gas supply pressure Ps and the cylinder chamber back pressure Pv become as follows:

| Pilot Valve Opening Av | Af | 1.5 Af | 2 Af |
|---|---|---|---|
| Valve Plug Position | Fully closed | Half opened ½ | Fully opened |
| Spring Compression Force Fs | 0 (Natural length) | 3Ps At/4 | 3Ps At/2 |
| Nozzle Throat Pressure Pt | 0 (Vacuum) | Ps/2 | Ps |
| Combustion Gas Supply Pressure Ps | Ps | Ps | Ps |
| Cylinder Chamber Back Pressure Pv | Ps | Ps/1.5 | Ps/2 |

That is, at the opening action starting time of the valve plug 104, if the pilot valve 112 opens slightly larger than the valve plug inner orifice area Af, the cylinder chamber back pressure Pv slightly lowers to loose the balance of force and the valve plug 104 moves to open While the valve plug 104 is in the opening action, the nozzle throat pressure Pt increases and the valve plug 104 moves to further open.

Immediately before the fully opened position of the valve plug 104, the reverse directional force due to the spring 108 becomes large and the motion of the valve plug 104 is retarded.

At the closing action starting time of the valve plug 104, the opening of the pilot valve 112 becomes smaller than 2Af, the cylinder chamber back pressure Pv increases and the valve plug 104 moves to close.

The side thruster valve of the present second embodiment can be assembled into a side thruster device as shown in FIG. 10. That is, two of the side thruster valves having their backs mutually opposed to each other are arranged symmetrically relative to an axis of an aerospace craft and are joined to a case 120 of a single gas generator.

An insulator 121 is provided within the case 120 and solid propellant 122 is filled inside of the insulator 121. Combustion gas 124 is generated from combustion surface 123 of the solid propellant 122.

FIG. 10 shows a state of the side thruster device, wherein the two side thruster valves are in the neutral positions, as no thrust is needed. If the two side thruster valves are fully opened to thereby cancel the generated thrust and, at the same time, the nozzle throat areas are doubled of the rated combustion time to thereby lower the pressure of combustion gas 124 in the gas generator, then the combustion speed 125 of the solid propellant 122 is lowered and the fuel consumption can be improved.

If thrust is needed on one of the two side thruster valves, the nozzle throat of that side thruster valve is opened and the other side thruster valve is fully closed. Thereby, surface combustion of the solid propellant 122 is effected and combustion gas is discharged from that nozzle throat to thereby generate the thrust.

That is, the two side thruster valves, made in the compact and light weight form so as to save energy in the opening and closing actions, are provided independent of each other. Thereby, a wide freedom of controlling the opening and closing of the side thruster valves can be obtained and, especially when no thrust is needed, the respective side thruster valves are controlled to be fully opened. Thereby, the combustion speed 125 of the solid propellant is lowered and the fuel consumption can be improved.

In the above, while the invention has been described based on the embodiments as illustrated, the invention is not limited to the mentioned embodiments but, as a matter of course, may be added with various modifications in the concrete structure within the scope of the appended claims.

For example, in the second embodiment, the actuator 109 as the main component part constructing the device for controlling the cylinder chamber 115 to open into the atmosphere, is described as the linear type actuator, but it is not limited to the linear type and any type of the device, if it opens and closes the pilot orifice 111, can be employed.

What is claimed is:

1. A side thruster valve of a type performing thrust adjustment for motion control of an aerospace craft by changing valve plug opening and thereby changing jetting of combustion gas, comprising a valve plug having its back directed to an axis of said aerospace craft and independently movable between a fully opened position and a fully closed position of said valve plug in a plane orthogonal to the axis of said aerospace craft, an actuating means for moving said valve plug in an axial direction of said valve plug and an elastic member for activating said valve plug in the axial direction of said valve plug; wherein said elastic member is a spring that activates said valve plug to a neutral position from the fully opened position or the fully closed position of said valve plug and said spring is set to its natural length when said valve plug is in said neutral position.

2. A side thruster valve as claimed in claim 1, wherein said valve plug is constructed integrally and coaxially with a piston that is slidable within a cylinder by receiving the combustion gas on one side of said piston, the one side of said piston communicates with a cylinder chamber formed on the other side of said piston via an orifice and there are provided a device that controls said cylinder chamber to open into the atmosphere and a spring as said elastic member that activates said valve plug to a closing side of said valve plug.

3. A side thruster device comprising a plurality of side thruster valves as claimed in claim 1, said plurality of side thruster valves being arranged independently of each other at symmetrical positions relative to the axis of said aerospace craft.

4. A side thruster device comprising a plurality of side thruster valves as claimed in claim 2, said plurality of side thruster valves being arranged independently of each other at symmetrical positions relative to the axis of said aerospace craft.

* * * * *